(12) United States Patent
Schaller (10) Patent No.: US 7,591,381 B2
(45) Date of Patent: Sep. 22, 2009

(54) COVER SYSTEM AND METHOD FOR MAKING THE SAME FOR USE WITH A TWIN CHANNEL CLARIFIER TANK

(75) Inventor: Earle Schaller, Palm Beach Gardens, FL (US)

(73) Assignee: NEFCO, Palm Beach Gardens, FL (US)

( * ) Notice: Subject to any disclaimer, the term of this patent is extended or adjusted under 35 U.S.C. 154(b) by 0 days.

(21) Appl. No.: 11/888,319

(22) Filed: Jul. 31, 2007

(65) Prior Publication Data

US 2009/0032476 A1 Feb. 5, 2009

(51) Int. Cl.
*B01D 21/24* (2006.01)

(52) U.S. Cl. ............. 210/519; 210/528; 210/540; 210/541

(58) Field of Classification Search ......... 210/800, 210/232, 519, 521, 528, 539, 540, 541; 220/831, 220/832, 565, 600, 660
See application file for complete search history.

(56) References Cited

U.S. PATENT DOCUMENTS

| | | | | |
|---|---|---|---|---|
| 307,235 A * | 10/1884 | Slevin | ............. | 220/831 |
| 3,395,800 A * | 8/1968 | Kraus et al. | ............. | 210/519 |
| 3,717,257 A * | 2/1973 | Boyle | ............. | 210/521 |
| 3,891,557 A * | 6/1975 | Edgerton | ............. | 210/519 |
| 4,038,185 A * | 7/1977 | Kline | ............. | 210/519 |
| 4,127,488 A * | 11/1978 | Bell et al. | ............. | 210/519 |
| 4,391,704 A * | 7/1983 | Anderson | ............. | 210/539 |
| 4,696,412 A * | 9/1987 | McGowan et al. | ............. | 220/832 |
| 4,767,536 A * | 8/1988 | Roley | ............. | 210/539 |
| 5,072,828 A * | 12/1991 | Irvine | ............. | 220/831 |
| 5,670,045 A * | 9/1997 | Schaller | ............. | 210/540 |
| 5,965,023 A * | 10/1999 | Schaller | ............. | 210/540 |
| 6,216,881 B1 * | 4/2001 | Schaller | ............. | 210/540 |
| 6,712,222 B2 * | 3/2004 | Schaller | ............. | 210/540 |

* cited by examiner

*Primary Examiner*—Christopher Upton
(74) *Attorney, Agent, or Firm*—Sofer & Haroun, LLP (57) ABSTRACT

A cover system for a clarifier tank having a combined effluent and influent trough separated by a dividing wall. The cover system includes a mounting bracket attached to an inboard wall of the influent trough and at least one openable cover panel attached to the mounting bracket. An opposite support bracket is located on the dividing wall between the influent and the effluent troughs, where the cover panel covers the effluent channel and is openable for cleaning of the effluent channel.

7 Claims, 9 Drawing Sheets

COVER SYSTEM AND METHOD FOR MAKING THE SAME FOR USE WITH A TWIN CHANNEL CLARIFIER TANK

FIELD OF THE APPLICATION

This application is in the field of clarifier tanks. More particularly, the application is in the field of an improved cover for use on clarifier tanks.

BACKGROUND

Figure 1:
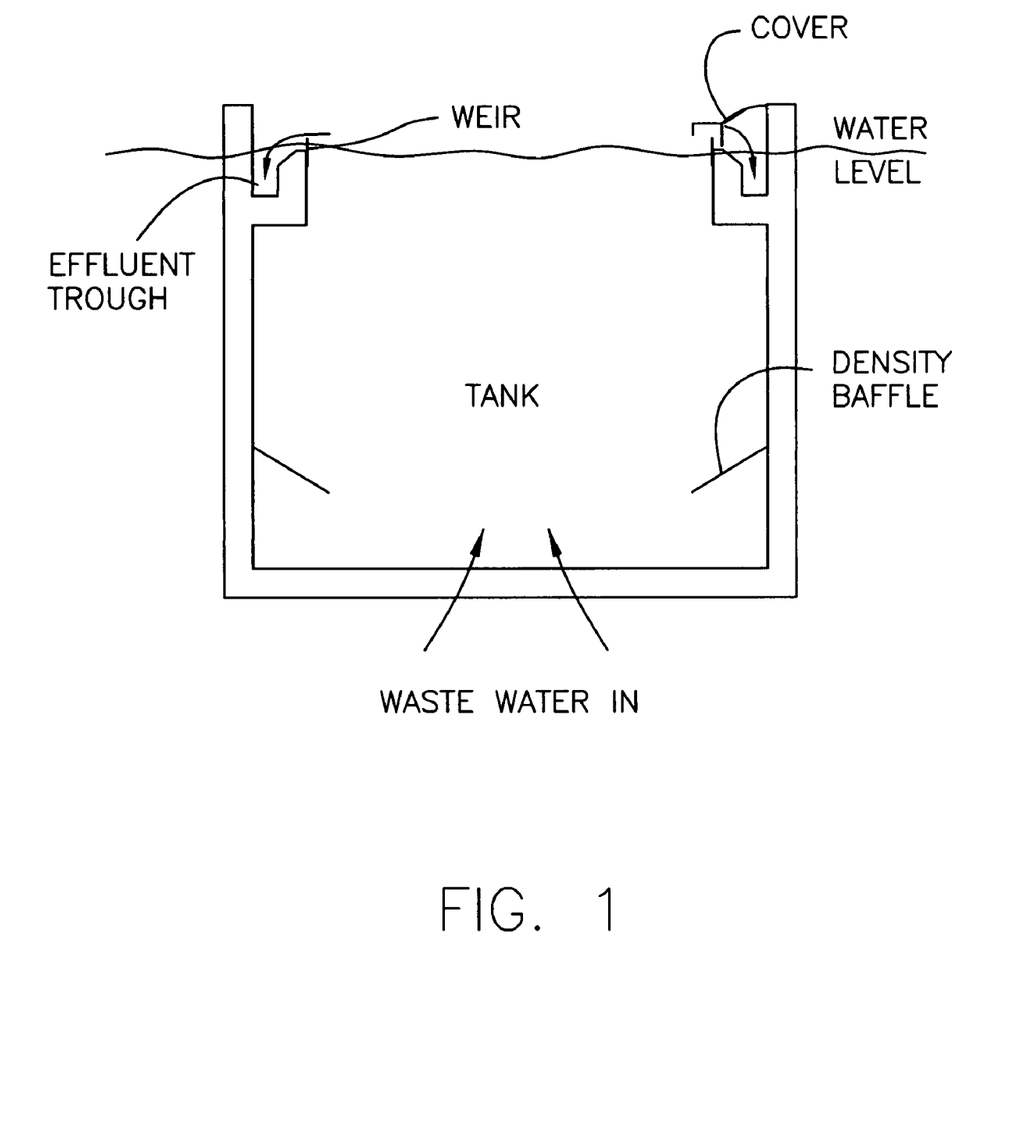
FIG. 1 is a prior art illustration of a ordinary clarifier tank.

In the sewage treatment industry, clarifier tanks are used to remove solid waste from the water. Typical clarifier tanks as shown in FIG. 1, employ a main tank, an agitation device, optional density baffles, and an effluent trough. In use, raw or semi-treated water is pumped into the bottom center of the tank. Density baffles and gravity assist in holding down solids. The cleaner water then spills over into the effluent trough (usually, but not necessarily, located along the upper outer circumference of the tank) and off to further treatment. In order to reduce buildup of algae and other such unwanted contaminants caused by light, a cover is usually disposed over the effluent trough to block sunlight.

Figure 2:
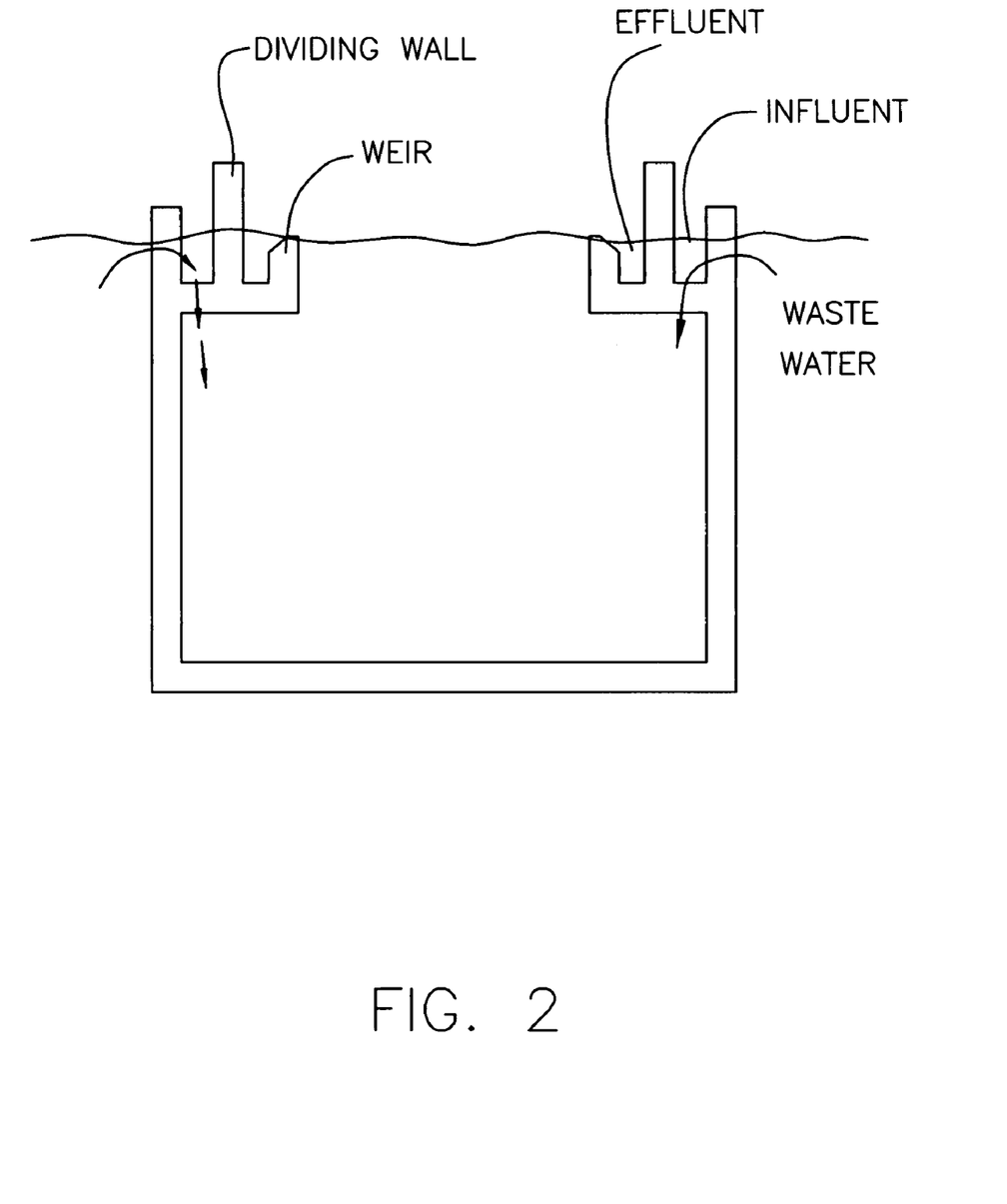
FIG. 2 is a prior art illustration of a clarifier tank having a combined effluent influent trough along the upper circumference.

However, as shown in FIG. 2, a newer type of clarifier tank, includes a double trough system, whereby a first outer wall trough around the upper circumference is used as an influent trough (instead of a bottom fed tank) and a second attached effluent trough is located inboard of the influent trough for receiving the clarified outgoing water. These two troughs are divided by an upwardly extended dividing wall. In one arrangement, the upwardly extending dividing wall is non-circular, such that the relative widths of the influent and effluent troughs vary with respect to one another.

OBJECTS AND SUMMARY

The present invention looks to provide a modified cover system such as that shown in FIG. 1, for employment on the two trough tank system as shown in FIG. 2.

In one arrangement, the cover system is modified to extend over the effluent trough from the upwardly extending dividing wall to the inboard wall of the trough.

In one arrangement the cover is produced in uniform panels which include a modification portion that allow the covers to be easily confirmed for non regularly shaped effluent troughs.

To this end, the present invention provides for a cover system for a clarifier tank having a combined effluent and influent trough separated by a dividing wall. The cover system includes a mounting bracket attached to an inboard wall of the influent trough and at least one openable cover panel attached to the mounting bracket.

An opposite support bracket, located on the dividing wall between the influent and the effluent troughs, where the cover panel covers the effluent channel and is openable for cleaning of the effluent channel.

DETAILED DESCRIPTION

Figure 3:
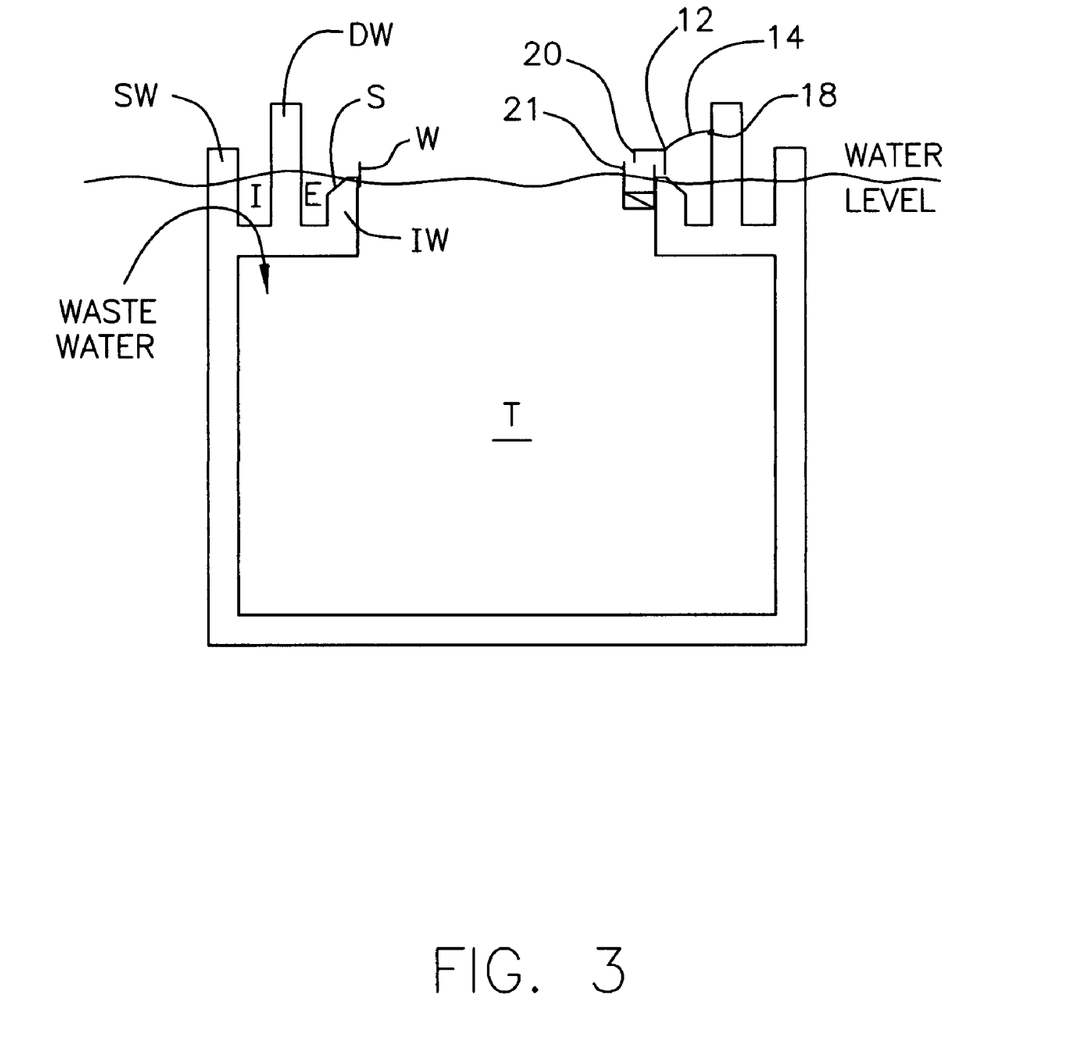
FIG. 3 is a cross sectional view of a cover system (closed) for a clarifier tank having a having a combined effluent influent trough along the upper circumference, in accordance with one embodiment.
Figure 4:
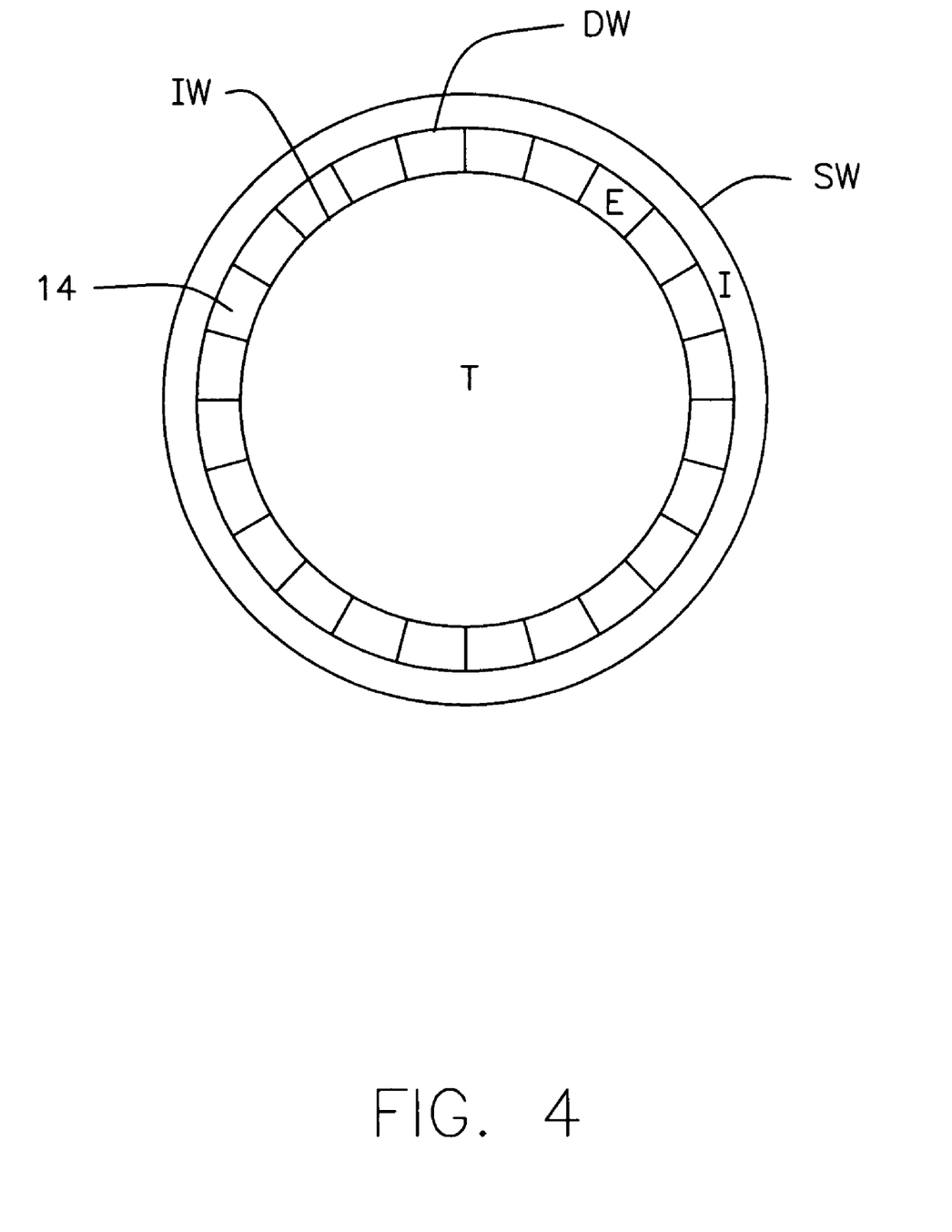
FIG. 4 is a top view of the cover system from FIG. 3, in accordance with one embodiment.

FIGS. 3 and 4 illustrates a clarifier tank T having an outside wall SW, an influent trough I, an effluent trough E, with a dividing wall DW an inboard wall IW, spillway S and weir W, each with their ordinary clarifier tank functions. Water in tank T first enters through influent trough I drains through holes into the main tank. Eventually, the water re-enters into effluent trough E over spillway S and weir W for removal from the tank.

Figure 5:
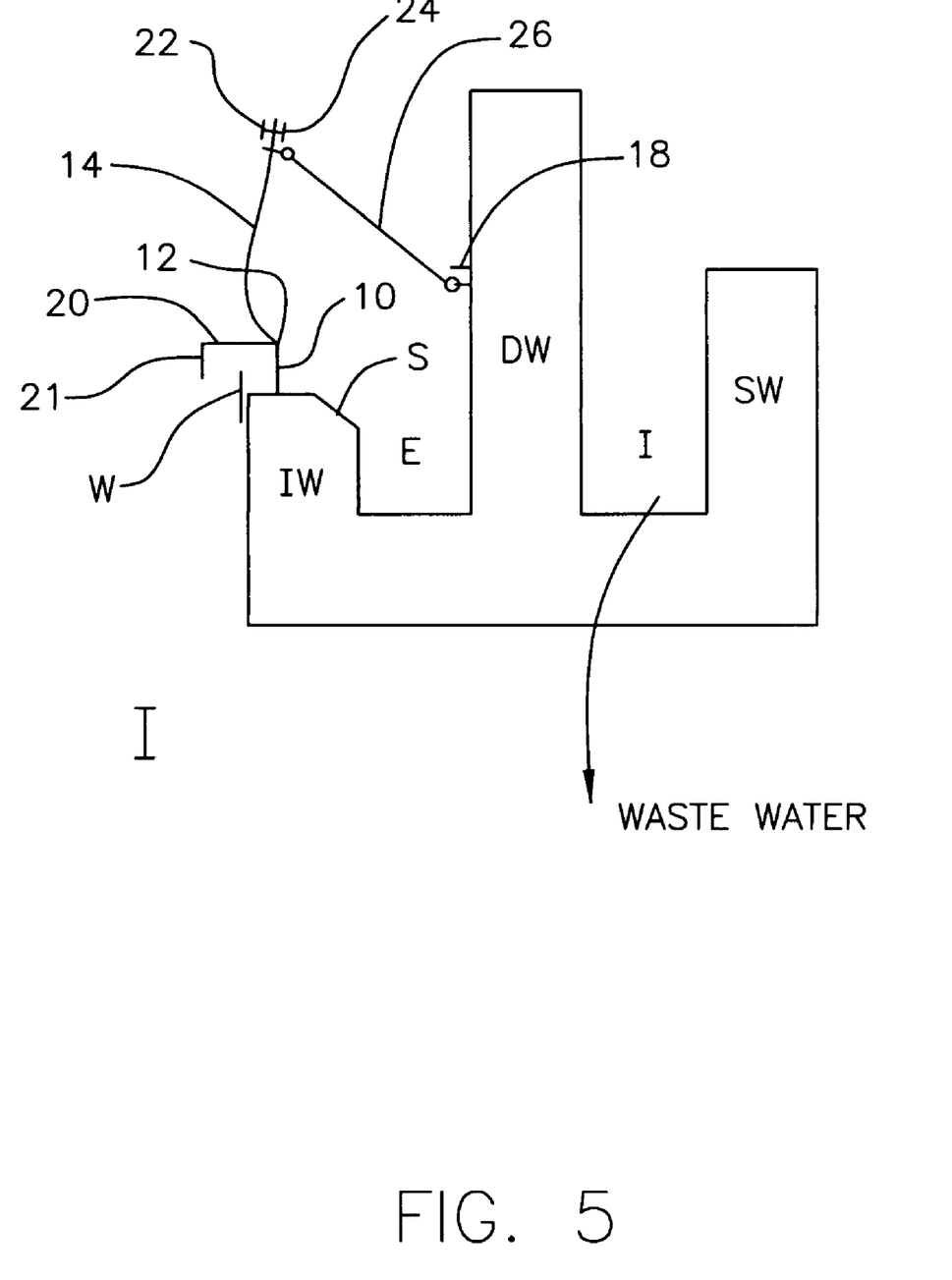
FIG. 5 is a cross sectional view of the cover system (open) of FIG. 3 for a clarifier tank having a having a combined effluent influent trough along the upper circumference, in accordance with one embodiment.

As shown in FIG. 5, mounting bracket 10 is attached to inboard wall IW and supports a cover mounting section 20 that has a pivot hinge 12 and an openable cover panel 14 (herein after referred to as "cover panel 14"). Cover panel 14 extends from hinge 12 to an opposite support bracket 18. An optional integrated baffle 21 may be coupled to mounting section 20 to further keeping solids from entering effluent trough E. Likewise, an optional second weir (not shown) within effluent channel E may be used for additional solid separation.

In one embodiment, an optional handle 22 and latch 24 may be employed on panel 14 to lock panel 14 in a closed position against opposite support bracket 18 as shown in FIG. 5. In another embodiment, a restrain cable 26 may be attached from en eyelet on dividing wall DW to another eyelet on the underside of cover panel 14. This allows a clearer on the outboard side of effluent trough (closer to outer circumference of tank) to flip open cover panel 14 for cleaning of spillway S, weir W and effluent trough E and then easily close panel 14 by pulling on restraint cable 26.

Figure 6:
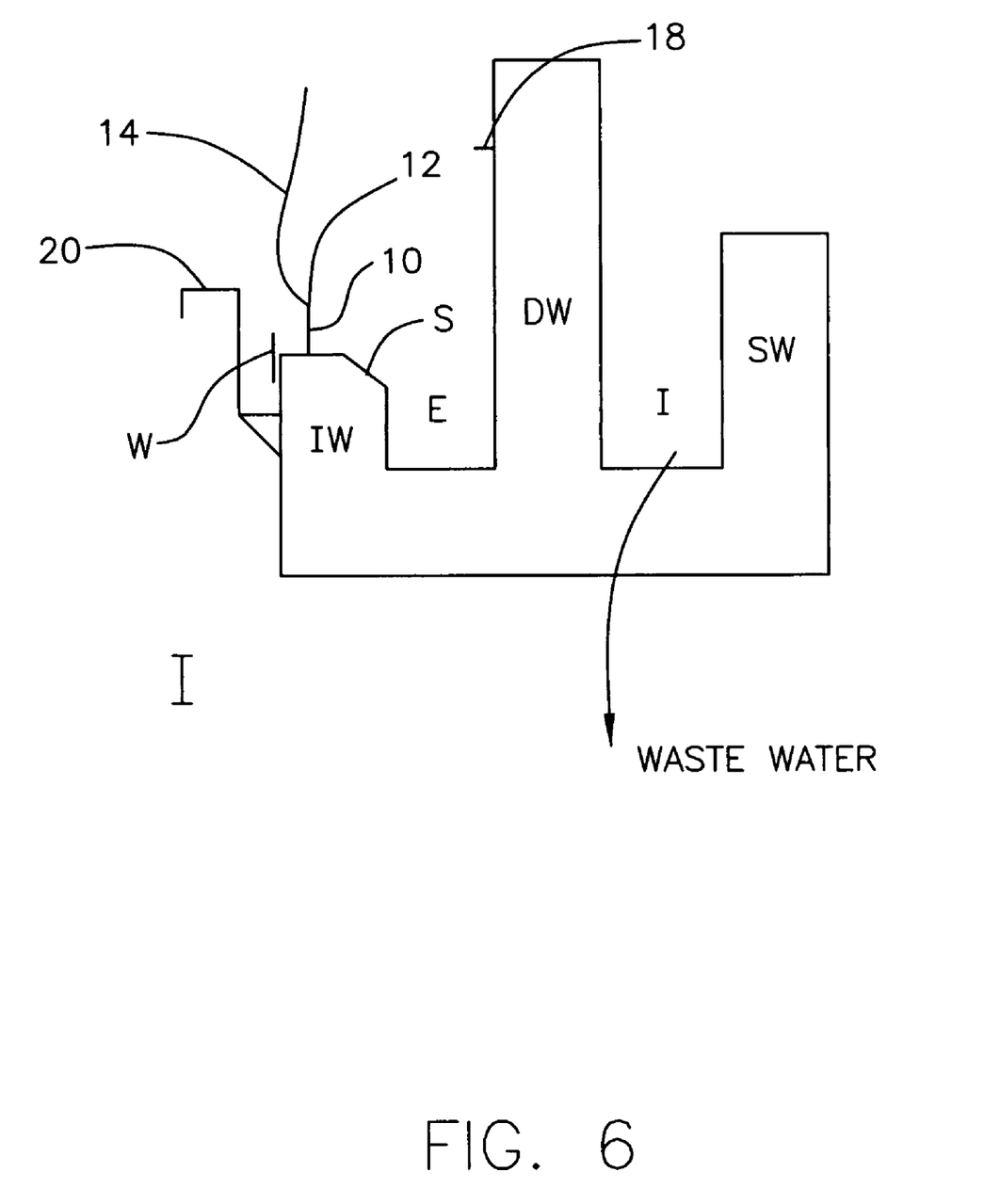
FIG. 6 shows an alternate mounting bracket arrangement from FIG. 3, in accordance with one embodiment.

As shown in FIG. 6, in one embodiment, mounting bracket 10 and optional integrated baffle 20 is mounted on inboard wall IW above spillway S in such a way that, when open, cover panel 14 allows for complete exposure of weir W so that thorough cleaning may be achieved without the need for panel 14 removal.

Figure 7:
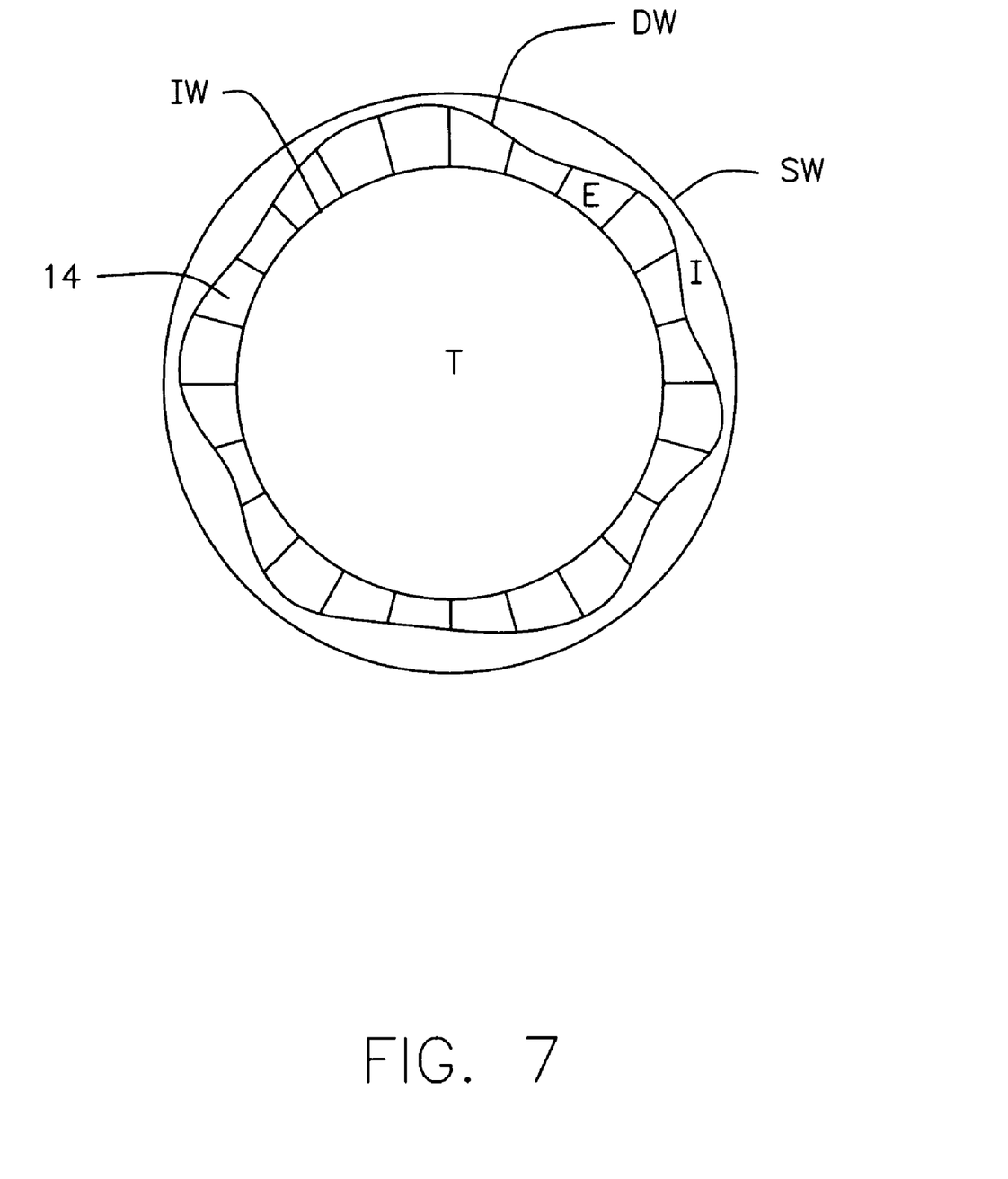
FIG. 7 is a top view of a cover system for a clarifier tank having a having a combined effluent influent trough along the upper circumference with varying trough widths, in accordance with one embodiment.

As shown in FIG. 7, dividing wall DW between influent trough I and effluent trough E may be irregularly shaped, resulting in the relative widths of effluent trough E and influent trough I varying with respect to one another. As shown, cover panels 14 need to have curved/non-linear edges where they contact opposite support bracket 18.

Figure 8:
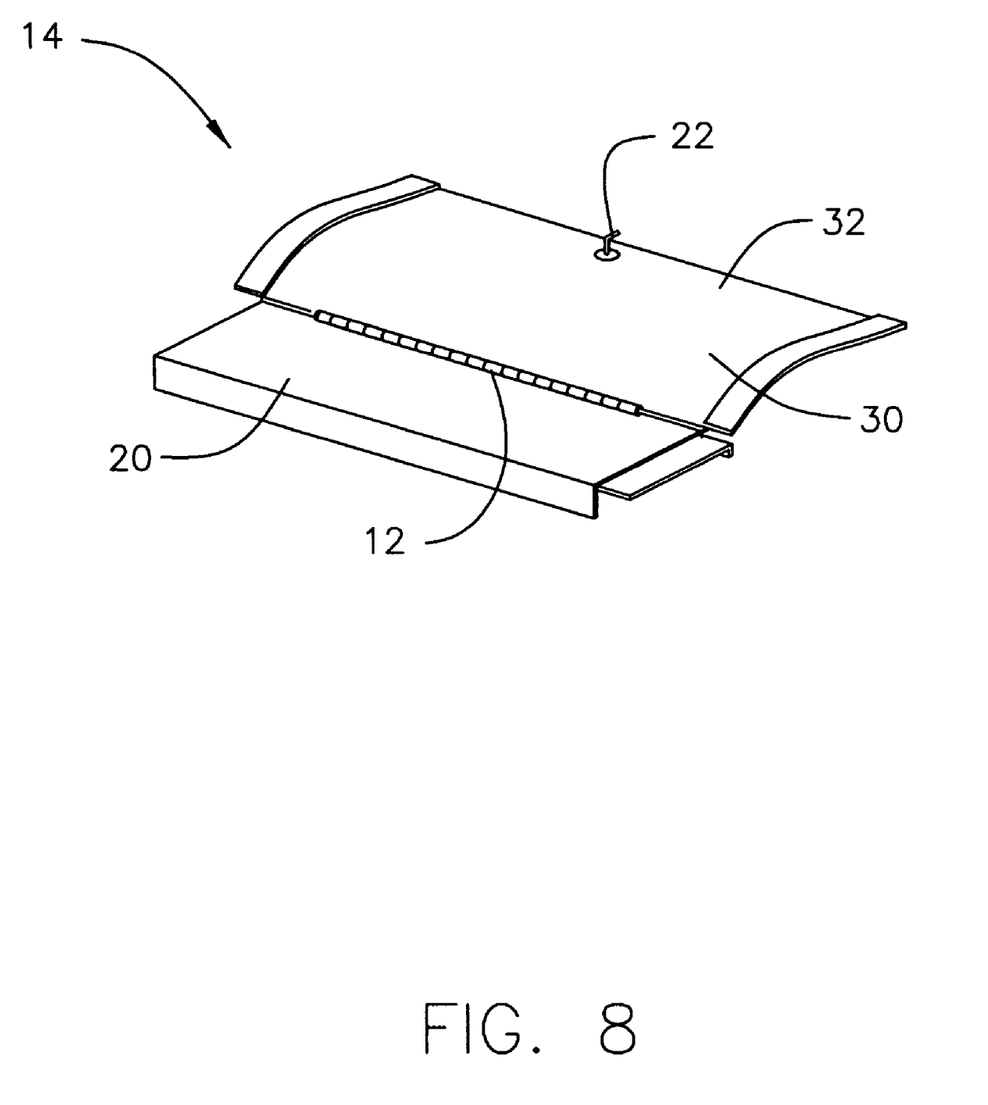
FIG. 8 is a perspective view of a single cover panel from the cover system of FIG. 7, before installation, in accordance with one embodiment.

Thus, for example, FIG. 8 shows a perspective view of panel 14, with hinge 12 and integrated baffle 20. In such an arrangement panel 14 has a hinge portion 30 and a support bracket portion 32. Panels 14 are preferably manufactured from a translucent fiberglass or fiberglass composite, but may be alternative constructed of other light blocking materials as desired.

Figure 9:
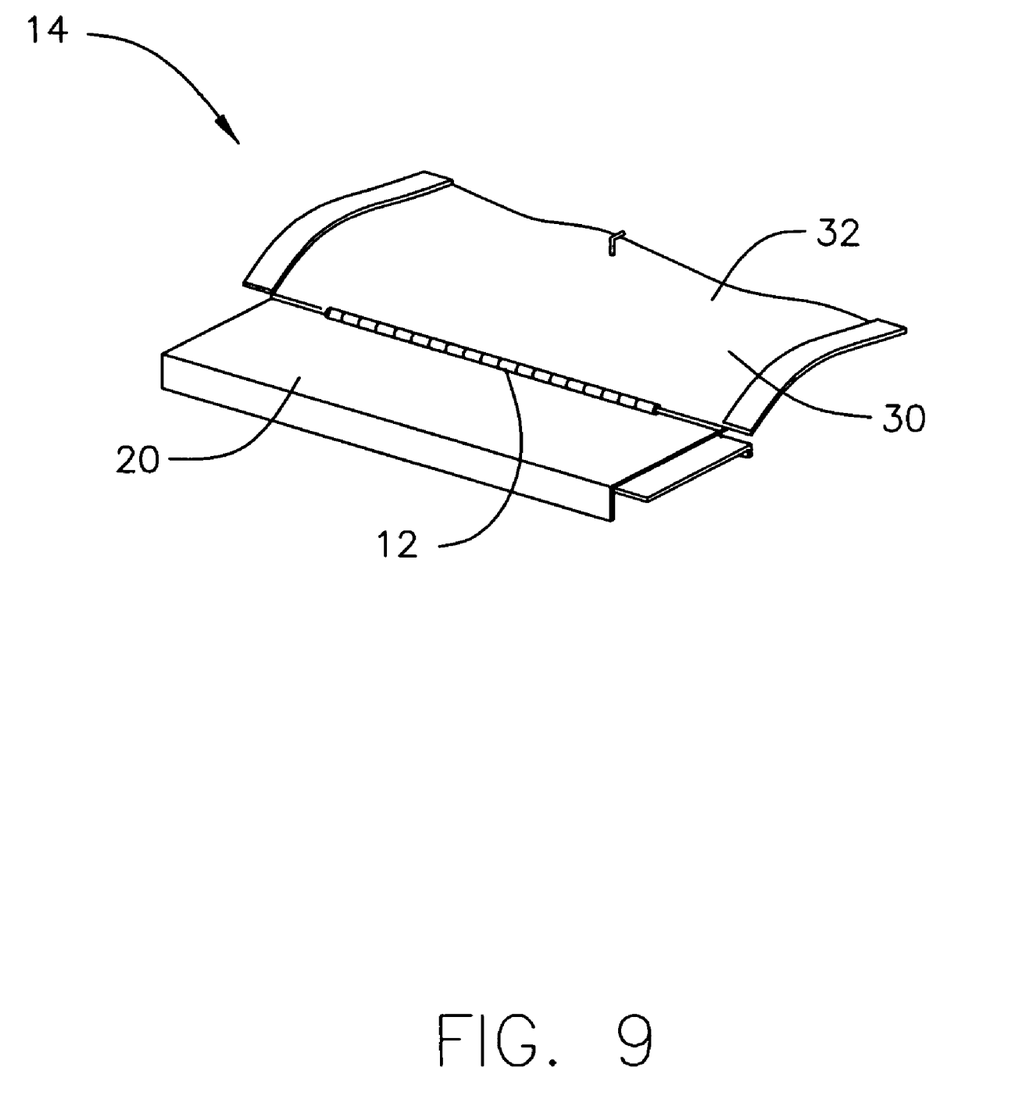
FIG. 9 is a perspective view of a panel from FIG. 8 after cutting, in accordance with one embodiment.

During manufacture, panels 14 are made having a support bracket portion 32 that is at least long enough to cover all of effluent trough E, even at its widest points. As shown in FIG. 9, once dimensions of effluent trough E are known, then pre-formed panels 14, particularly in support bracket portion 32 may be cut so that they, when installed, would lie flush along opposite support brackets 18 positioned along the inboard side of dividing wall DW.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

The invention claimed is:

1. A cover system for a clarifier tank having a combined effluent and influent trough separated by a dividing wall, said cover system comprising:
    a mounting bracket attached to an inboard wall of said influent trough;
    at least one openable cover panel attached to said mounting bracket; and
    an opposite support bracket located on said dividing wall between said influent and said effluent troughs, wherein said cover panel covers said effluent trough channel and is openable for cleaning of said effluent trough channel, wherein said dividing wall separating said effluent trough and said influent trough is irregularly shaped resulting in the relative widths of said influent and effluent troughs changing around the circumference of said tank and wherein said cover panel has a hinge portion and a support bracket portion, wherein only said support bracket portion is cut to fit said irregularly shaped dividing wall.

2. The system as claimed in claim 1, further comprising a plurality of cover panels for covering the entire effluent trough channel.

3. The system as claimed in claim 1, further comprising a handle and latch for locking said cover panel against said opposite support bracket.

4. The system as claimed in claim 1, further comprising a restraining that is attached to cover panel to prevent it from opening too far, and to allow a force applied to the restraining wire to close said cover panel.

5. The system as claimed in claim 1, wherein said cover panel further maintain a hinge and integrated baffle portion.

6. The system as claimed in claim 5, wherein said mounting bracket is configured to support said cover panel and said hinge in such a manner that, when opened, the entire effluent trough channel and weir are exposed for cleaning.

7. A method for covering a clarifier tank having a combined effluent and influent trough separated by an irregularly shaped dividing wall that results in varying width effluent and influent troughs, said method comprising the steps of:
    attaching a mounting bracket to an inboard wall of said influent trough;
    attaching an opposite support bracket to said dividing wall between said influent and said effluent troughs;
    obtaining a cover panel having a hinge portion and a support bracket portion, and cutting only said support bracket portion to match the shape of said dividing wall corresponding to the attachment location of said cover panel, wherein said dividing wall separating said effluent trough and said influent trough is irregularly shaped resulting in the relative widths of said influent and effluent troughs changing around the circumference of said tank; and
    attaching at least one openable cover panel to said mounting bracket for covering said effluent trough.

* * * * *